UNITED STATES PATENT OFFICE.

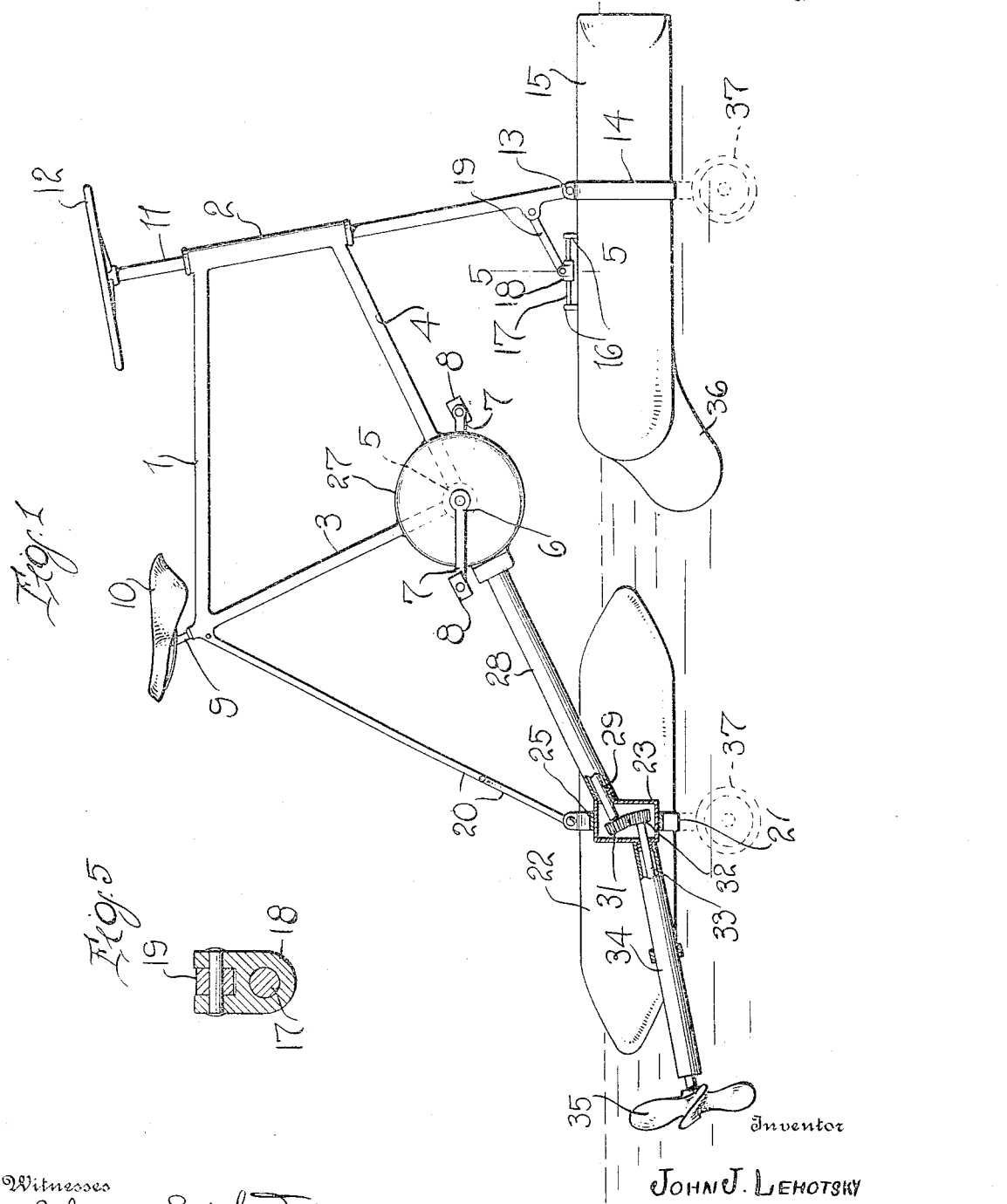

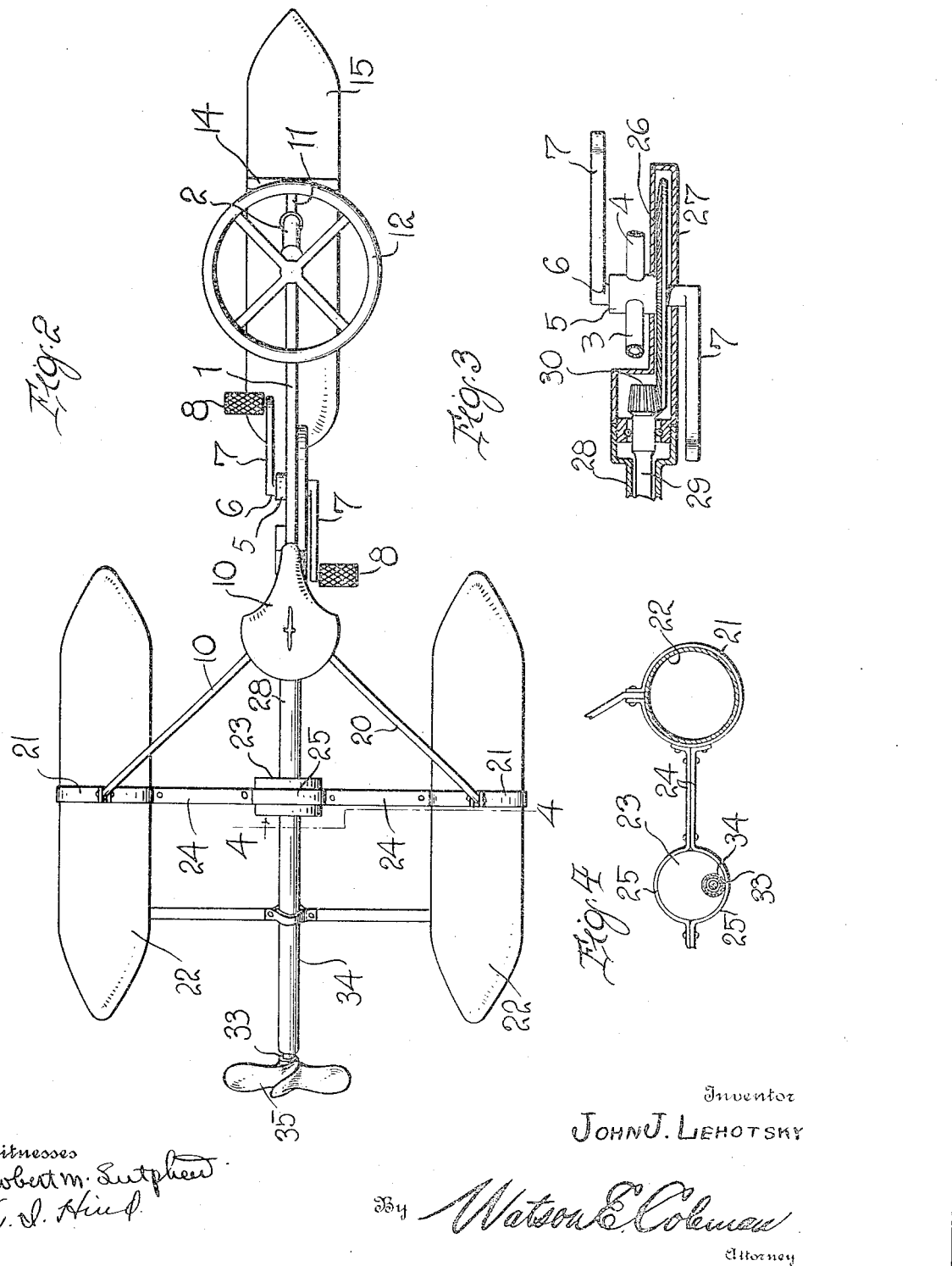

JOHN J. LEHOTSKY, OF PHILADELPHIA, PENNSYLVANIA.

BICYCLE-BOAT.

1,126,037.     Specification of Letters Patent.     Patented Jan. 26, 1915.

Application filed August 24, 1914.   Serial No. 858,297.

*To all whom it may concern:*

Be it known that I, JOHN J. LEHOTSKY, a citizen of the United States, residing at Philadelphia, in the county of Philadelphia and State of Pennsylvania, have invented certain new and useful Improvements in Bicycle-Boats, of which the following is a specification, reference being had to the accompanying drawings.

This invention relates to boats, and particularly to boats which are adapted to be propelled through water by foot power, and which are generally designated as bicycle boats.

An object of this invention is to improve and simplify the construction of boats of this character, to render the same durable and efficient in use, and more commercially desirable.

A further object of this invention is the provision of a bicycle boat which is provided with two rear floats and a front float supporting the frame, the front float being provided with a fin or rudder so that upon turning of the float, the boat will be steered in the desired direction.

A still further object of this invention is the provision of a bicycle boat of this character in which the front float thereof is loosely connected to the steering post of the boat frame, whereby the front float of the boat will always retain its horizontal position regardless of the direction in which the same is turned.

With these and other objects in view, my invention consists in the novel construction, combination, and arrangement of parts, to be hereinafter more fully described, claimed, and illustrated in the accompanying drawing, in which—

Figure 1 is a side elevational view of my improved bicycle boat; Fig. 2 is a top plan view thereof; Fig. 3 is a fragmentary sectional view showing the manner of operatively connecting the crank shaft and the drive shaft; Fig. 4 is a sectional view on the line 4—4 of Fig. 2; and Fig. 5 is a sectional view on the line 5—5 of Fig. 1.

Referring more particularly to the drawing, the frame of my improved bicycle boat comprises an upper horizontal bar 1, which is connected at its forward and rear ends to tubular inclined bars 2 and 3 respectively. Extending downwardly and rearwardly from the lower end of the front bar 2 is the lower bar 4 of the frame which is connected at its rear end to the lower end of the rear bar 3, the bars 3 and 4 at their juncture forming a bearing 5 in which a crank shaft 6 is mounted, the cranks 7 of which are provided with suitable pedals 8. Slidably mounted in the tubular rod 3 is a seat post 9 upon the upper end of which a seat 10 is mounted, and rotatably mounted in the front bar 2 is a steering post 11 to the upper end of which a steering wheel 12 is connected, the lower end of the steering post having a transverse pivot pin 13 extending therethrough upon which the opposite ends of the clamping band 14 are pivotally mounted, the clamp being secured around an air tank 15 which comprises the front float of the boat. Supported in brackets 16 secured in the upper face of the tank rearwardly of the post 11 is a longitudinal rod 17 upon which a sleeve 18 is slidably mounted, and pivotally connected at its ends to the sleeve 18 and the post 11 is a link 19, the sleeve 18 serving to limit the pivotal movement of the tank with relation to the steering post.

Extending downwardly and rearwardly from the upper end of the rear bar 3 of the frame are diverging supporting arms 20, to the lower ends of which are secured the opposite ends of clamping bands 21, within which are supported the rear floats for air tanks 22. Arranged between the tanks 22 is a casing 23 and secured at their opposite ends to the clamping bands 21 are connecting bars 24 which are secured together at their ends, and are curved as at 25 intermediate of their ends to provide a loop extending around the casing 23 to hold the same in position between the tanks. Mounted on the crank shaft 6 is a gear wheel 26 which is inclosed within a suitable casing 27, and connected at one end to the casing 27 is a tubular housing 28, the opposite end of the housing 28 being connected to the casing 23 supported between the tanks. Rotatably mounted within the housing 28 is a drive shaft 29, the forward end of which has a gear 30 mounted thereon meshing with the gear wheel 26, the rear end of the shaft having a pinion 31 secured thereto, the pinion 31 meshing with a similar pinion 32 carried on the forward end of a rearwardly extending propeller shaft 33, the propeller shaft being also inclosed in a tubular housing 34 which is connected at its forward end to the casing 23. The rear end of the propeller shaft 33 projects rearwardly of the housing 34 and rearwardly of the floats 22, and has connected thereto a propeller 35 which when rotated is adapted to drive the boat through the water. Extending rearwardly and downwardly from the front float 15 is a fin or rudder 36 which will engage a relatively large body of water when the float 15 is turned so that the machine will be steered in any desired direction upon rotation of the steering wheel 12. If desired, suitable rollers 37 may be connected to the floats 15 and 22 so that the boat may be easily moved over solid ground upon the rollers, without lifting the device into the air.

In the practical use of my device, the same is driven as an ordinary bicycle, the operator being mounted upon the seat 10 with his feet engaged upon the pedals 8, and his hands grasping the steering wheel 12, whereby upon rotation of the crank shaft 6, the device is propelled forwardly, and is steered in any desired direction by means of the wheel 12. By loosely connecting the front floats 15 to the inclined steering post 11, it will be seen that the float 15 may rise and float with the waves, so that the float will always ride the waves in a horizontal position, the loose connection also serving to prevent the lifting of the forward end of the float out of the water when the inclined steering post is turned to steer the boat. By the provision of the sleeve 18 which is slidably mounted upon the rod 17, rocking movement of the float 15 upon the post 11 is limited by reason of the engagement of the sleeve 18 with the brackets 16. It will further be seen that all of the driving elements of my improved boat are inclosed whereby the water is prevented from reaching the pinions and gears and corroding the same, and the boat may be always propelled through the water.

Having thus fully described my invention, what I desire to claim and secure by Letters Patent is:—

1. A bicycle boat comprising a frame, a pair of spaced floats carried by the rear end of the frame and arranged below the same, an inclined steering post rotatably mounted in the forward end of the frame, a float pivotally connected to the lower end of the steering post, spaced standards formed on the float rearwardly of the steering post, and means connected with the post and mounted between said standards to limit the vertical pivotal movement of the float, as and for the purpose set forth.

2. A bicycle boat comprising a frame, a pair of spaced floats carried by the rear end of the frame and arranged below the same, an inclined steering post rotatably arranged in the forward end of the frame, a float pivotally connected with the lower end of the steering post, spaced upstanding brackets formed on the float rearwardly of the steering post, a rod arranged between said brackets, a sleeve slidably mounted upon the rod, the ends of said sleeve being adapted for engagement with the upstanding brackets, and means connecting said sleeve with the steering post whereby to limit the vertical pivotal movement of the float.

3. A bicycle boat comprising a frame, a pair of spaced floats carried by the rear end of the frame and arranged below the same, an inclined steering post rotatably mounted in the forward end of the frame, a float pivotally connected to the lower end of the steering post, spaced upstanding brackets formed on the float rearwardly of the steering post, a longitudinal rod carried in said brackets, a sleeve slidably mounted on the rod, a link pivotally connected at its ends to said sleeve and to the steering post, a propeller shaft supported between the rear floats, a propeller carried by said shaft, and means mounted in the frame for rotating said propeller shaft.

In testimony whereof I hereunto affix my signature in the presence of two witnesses.

JOHN J. LEHOTSKY.

Witnesses:
 ANDREW HANISKO,
 LOUIS SIEGLER.

Copies of this patent may be obtained for five cents each, by addressing the "Commissioner of Patents, Washington, D. C."